(12) United States Patent
Rodriguez

(10) Patent No.: US 9,402,099 B2
(45) Date of Patent: Jul. 26, 2016

(54) ARRANGEMENTS EMPLOYING CONTENT IDENTIFICATION AND/OR DISTRIBUTION IDENTIFICATION DATA

(75) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1007 days.

(21) Appl. No.: 13/425,339

(22) Filed: Mar. 20, 2012

(65) Prior Publication Data

US 2013/0097630 A1    Apr. 18, 2013

Related U.S. Application Data

(60) Provisional application No. 61/563,499, filed on Nov. 23, 2011, provisional application No. 61/560,155, filed on Nov. 15, 2011, provisional application No. 61/547,514, filed on Oct. 14, 2011.

(51) Int. Cl.

| | |
|---|---|
| *H04N 21/439* | (2011.01) |
| *H04N 21/414* | (2011.01) |
| *H04N 21/8352* | (2011.01) |
| *H04N 21/658* | (2011.01) |
| *H04N 21/4784* | (2011.01) |
| *H04N 21/422* | (2011.01) |
| *H04N 21/81* | (2011.01) |
| *G06Q 30/02* | (2012.01) |
| *H04N 21/4788* | (2011.01) |

(52) U.S. Cl.
CPC ....... *H04N 21/4394* (2013.01); *G06Q 30/0241* (2013.01); *H04N 21/41407* (2013.01); *H04N 21/42203* (2013.01); *H04N 21/4784* (2013.01); *H04N 21/4788* (2013.01); *H04N 21/6582* (2013.01); *H04N 21/812* (2013.01); *H04N 21/8352* (2013.01)

(58) Field of Classification Search
CPC .......... H04N 21/8358; H04N 21/4394; H04N 21/41407; H04N 2201/327
USPC ........................................................... 700/94
See application file for complete search history.

(56) References Cited

U.S. PATENT DOCUMENTS

| | | | |
|---|---|---|---|
| 6,122,403 A | 9/2000 | Rhoads | |
| 6,590,996 B1 | 7/2003 | Rhoads | |
| 6,614,914 B1 | 9/2003 | Gustafson | |
| 6,968,564 B1 | 11/2005 | Srinivasan | |
| 6,990,453 B2 * | 1/2006 | Wang | G06F 17/30743 704/270 |
| 7,006,555 B1 | 2/2006 | Srinivasan | |
| 7,359,889 B2 | 4/2008 | Barton | |
| 7,516,074 B2 | 4/2009 | Bilobrov | |
| 2002/0028000 A1 * | 3/2002 | Conwell et al. | 382/100 |
| 2005/0232411 A1 | 10/2005 | Lu | |
| 2007/0098172 A1 * | 5/2007 | Levy | H04N 1/00323 380/247 |
| 2007/0124756 A1 | 5/2007 | Baluja | |

(Continued)

*Primary Examiner* — Jesse Elbin
(74) *Attorney, Agent, or Firm* — Digimarc Corporation

(57) ABSTRACT

This technology concerns, in one aspect, using a person's social network graph data as a virtual visual cortex—taking image input from a smartphone or the like, and processing it with the graph data to yield a personalized form of processing based on the imagery. The user's network graph data is typically updated by such processing—providing a form of virtual image memory that can influence future social network behavior. In another aspect, the technology concerns identifying content (e.g., audio) by both fingerprint-based and watermark-based techniques, and arrangements employing such identification data. A great number of other features and arrangements are also detailed.

9 Claims, 3 Drawing Sheets

(56) References Cited

U.S. PATENT DOCUMENTS

| | | |
|---|---|---|
| 2007/0174059 A1 | 7/2007 | Brunk |
| 2007/0250716 A1 | 10/2007 | Brunk |
| 2007/0274537 A1 | 11/2007 | Srinivasan |
| 2008/0276265 A1 | 11/2008 | Venugopal |
| 2008/0300011 A1 | 12/2008 | Rodriguez |
| 2009/0282111 A1* | 11/2009 | Jacobs et al. .................. 709/206 |
| 2010/0036759 A1* | 2/2010 | Ben-Yaacov .......... G06Q 20/10 705/30 |
| 2010/0046842 A1 | 2/2010 | Conwell |
| 2010/0119208 A1* | 5/2010 | Davis et al. ..................... 386/83 |
| 2010/0150434 A1 | 6/2010 | Reed |
| 2010/0205628 A1 | 8/2010 | Davis |
| 2010/0222102 A1 | 9/2010 | Rodriguez |
| 2010/0226526 A1* | 9/2010 | Modro et al. ................. 382/100 |
| 2010/0322469 A1* | 12/2010 | Sharma ................ G10L 19/018 382/100 |
| 2011/0161076 A1 | 6/2011 | Rodriguez |
| 2011/0212717 A1 | 9/2011 | Rhoads |
| 2011/0274310 A1 | 11/2011 | Rhoads |
| 2012/0116559 A1 | 5/2012 | Davis |
| 2012/0210233 A1 | 8/2012 | Davis |

* cited by examiner

ARRANGEMENTS EMPLOYING CONTENT IDENTIFICATION AND/OR DISTRIBUTION IDENTIFICATION DATA

RELATED APPLICATION DATA

This application claims priority to provisional applications 61/563,499, filed Nov. 23, 2011, 61/560,155, filed Nov. 15, 2011, and 61/547,514, filed Oct. 14, 2011, both of which are incorporated by reference.

BACKGROUND

Microsoft's Windows Mobile 7.5 includes an "App Connect" feature that extends the user experience associated with Microsoft's Bing search service. For example, a user may invoke the Bing service to identify a soundtrack captured by a microphone of the mobile device. When Bing identifies the audio (e.g., by audio fingerprinting), it alerts certain application programs that subscribed to the results of Bing's audio searches, and provides relevant results of the search to these applications. Icons for these applications are then presented on the screen, and provide opportunities for the user, e.g., to purchase the soundtrack from different vendors.

As described below, Facebook has exposed aspects of the social graph on which its system is based.

The foregoing developments are leveraged in new ways to provide new advantages.

DETAILED DESCRIPTION

Figure 1:
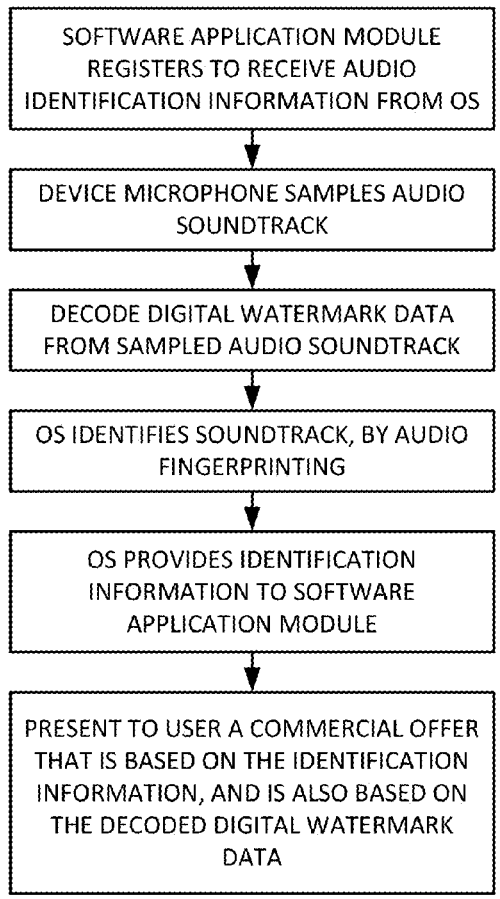
FIGS. 1-3 are flowcharts showing exemplary methods employing aspects of the present technology.

Referring to FIG. 1, a first exemplary embodiment of the present technology concerns a method of making a commercial offer to a user of a portable device (e.g., a smartphone or tablet computer).

In this method, a software application module (which may be executing on a processor in the device, or on a remote processor) registers to receive audio identification information from the device operating system (OS). An exemplary implementation uses the Bing App Connect technology noted above.

The device microphone samples ambient audio from the device's environment, such as a song, or a soundtrack to a television show.

The operating system identifies the soundtrack (e.g. by audio fingerprinting), and provides associated identification information to applications that have registered to receive such data—including the just-mentioned software application module.

The method also includes decoding digital watermark data from the sampled audio. Typically, this operation is performed by a processor in the device. However, in some implementations it may be performed by a remote processor (e.g., in the "cloud"). In the former case, the watermark decoding may be performed by operating system software. Alternatively, it may be performed by application software—such as the above-mentioned software application module, or by a different application module.

The method concludes by presenting to the user a commercial offer of some sort. The particular offer presented is based on the identification information provided by the operating system, and is also based on the decoded digital watermark data.

The foregoing will be made clearer by an example. Consider a user in a car, listening to satellite radio, such as from Sirius. The satellite radio distributor routinely digitally watermarks its transmitted audio with a steganographic signal conveying distribution information. This distribution information may indicate the corporate source (Sirius), the distribution channel (e.g., satellite channel 24), and the date/time of broadcast (e.g., Oct. 14, 2011 at 12:41 pm). (As is familiar, this information typically is not expressed literally, such as by encoded text. Instead, shorter codes are conventionally used, which are resolved through use of an associated database.)

The passenger's smartphone has a microphone that senses the ambient acoustic environment. If the music identification capability of the phone is active (such as by the passenger invoking the Bing functionality), the microphone-captured audio is processed by the operating system to generate audio fingerprint data. This data is sent by the phone to a remote database, which matches the received fingerprint data against reference fingerprint data to make an identification of the captured audio. The remote database returns associated information (e.g., song and artist name, album name, cover art, reviews, etc.) to the operating system.

In the present case, the audio identification data received by the phone's operating system may identify the ambient audio as the song "Finding My Way," by the band Rush.

While the fingerprint-based identification data identifies the song, it provides no information about the distribution channel. There is no indication as to whether the song was distributed by Sirius, or was part of a television soundtrack, or was an iTunes download, etc.

Watermark information encoded in the ambient audio resolves this ambiguity.

In the present case, watermark information decoded from the captured audio indicates that the audio was delivered to the passenger by Sirius satellite radio, on channel 24, at a certain date/time.

Nothing has yet been said about the application software module. The phone may be equipped with several such modules, provided by different entities. Sirius may provide one. Apple may provide another. ABC Television may provide another. Each may subscribe to the operating system's audio identification service (e.g., using App Connect). Each may include its own watermark decoding software, or the modules may all subscribe to a shared watermark decoding software module (which may be part of the operating system software, or not).

Upon learning that the user is listening to Sirius radio, the Sirius application software module may present the user with a promotional offer that involves Sirius. For example, since the user is listening to a Rush song, the Sirius software module may identify other Rush-related content in which the listener might be interested. For example, it might alert the user to the fact that the drummer for Rush, Neil Peart, will be a guest on a talk radio program broadcast tomorrow on Sirius's Howard Stern channel, channel 100. This channel is a premium service, available only to listeners who subscribe to an upscale Sirius content package. However, to entice the listener to try this upscale service, Sirius may provide the listener with an access code by which tomorrow's broadcast may be obtained without charge. This code may be presented on the screen of the listener's phone, together with other details of the upcoming program.

Promotions like this, which give users a sample of content to which they don't yet subscribe, in the hope that it may entice them to subscribe, may be termed "up-selling." If the offer is for additional goods/services by the same entity that distributed the audio, as here, it is termed an "affinity" offer. In contrast, an offer that promotes goods/services of a vendor other than the distributor may be regarded as a "competing" offer.

In the present circumstance, a competing offer may be made by Apple. Knowing that the user is listening to Sirius (as indicated by the distribution watermark), Apple knows that the user is willing to pay a monthly fee to listen to audio. Apple's application module software may use this information to target advertising to the user that promotes Apple's unlimited music downloading service (for a fixed fee per month). For example, Apple module may present an offer giving the user a 50% discount off a one-year subscription, if the user subscribes with a certain promotion code (displayed on the screen) within the next two hours.

Likewise, other registered application software modules can use knowledge about the song the user is listening to, together with information about its distribution source, to tailor competing offers.

The operating system may prioritize these various offers for presentation to the user based on various factors. One is popularity—with those offers that are most commonly accepted by users being presented most prominently. Another is sponsorship, with companies who agree to pay more (e.g., in Google AdWords-like automated auctions) being given priority placement in presentation of their offers.

Figure 2:
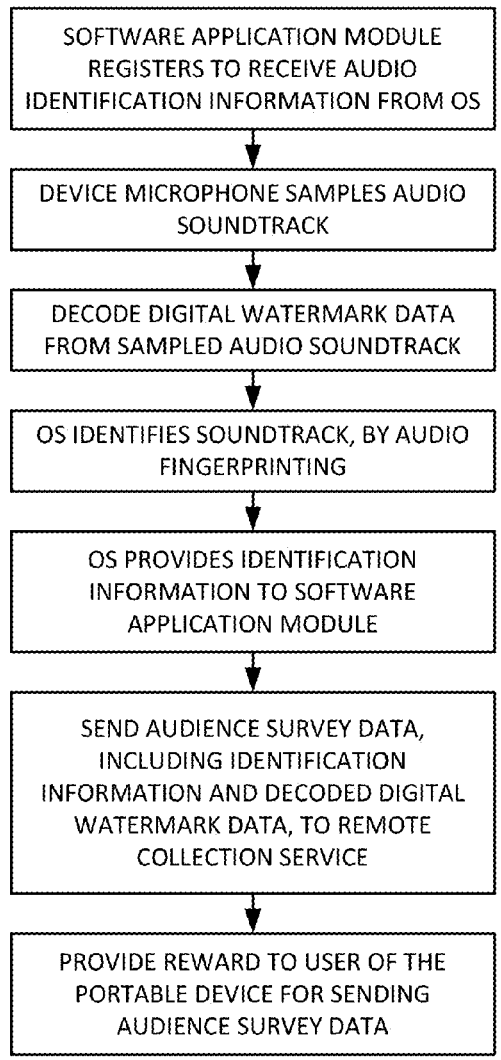
Figure 3:
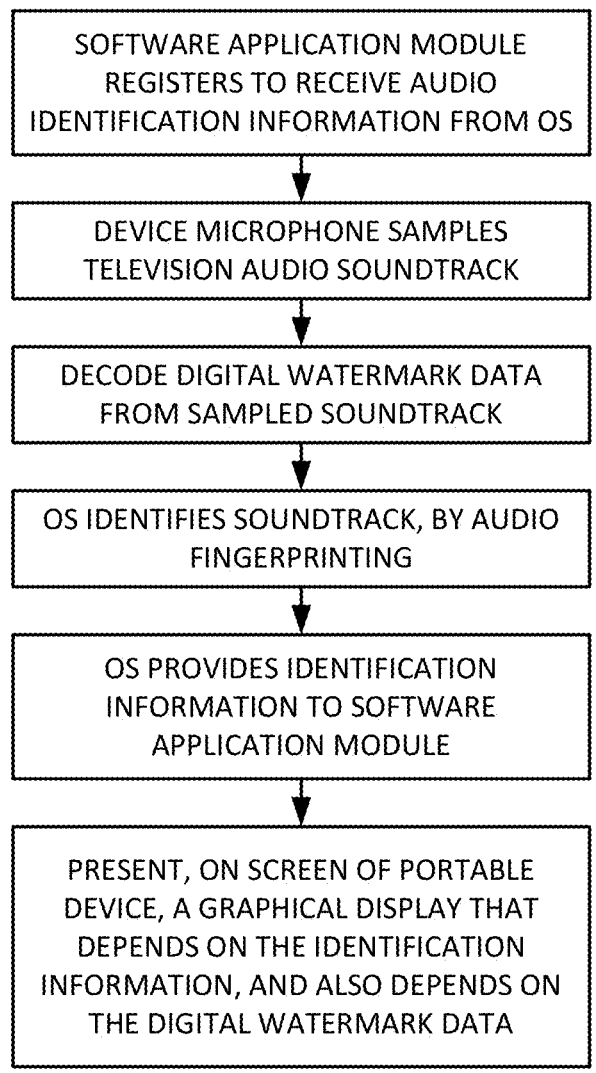

FIG. 2 shows a related method, used for audience survey purposes. Here, the user's portable device sends audience survey data to an audience measurement service, such as The Nielsen Company. This audience survey data can include both the audio identification information provided by the operating system service (e.g., identifying "Finding my Way" by Rush), and also the decoded digital watermark data (e.g., identifying the distribution source as Sirius channel 24, on Oct. 14, 2011 at 12:31 pm).

To induce users to share this information with the audience measurement service, the service can provide rewards to users. These can take any form, e.g., cash, subscription credit for content services (iTunes, Comcast, etc.), frequent flier miles, etc.

In some implementations, the device "free-runs" in this mode—providing a constant stream of audience survey data to the company. In other implementations, this mode of operation is gated based on context, e.g., location (only while at home; not work), time of day (only 6-9 am and 5-10 pm), etc.

Still another embodiment using aspects of the present technology is a "second screen" service, which provides information complementary to a television program on the screen of a tablet computer or smartphone. (As used herein, "television program" refers to any video presentation with accompanying audio, whether distributed by broadcast or otherwise. For example, a movie on DVD, or a movie presented in a theatre, are each considered a "television program" for purposes of the present application.)

Second screen applications are known. For example, the company TV Aura provides technology used by ABC Television to provide second screen content that is complementary with the television program Grey's Anatomy.

The TV Aura technology identifies the television program based on digital watermark data that is digitally encoded into the broadcast. Competing services work by identifying the television program by audio fingerprinting methods.

In accordance with this embodiment of the technology, both watermarking and fingerprinting are used. As before, fingerprinting is used to identify the content (here, a television program). And watermarking is used to identify the distributor/distribution channel.

Such arrangement allows the second screen content to be tailored not just to the program, but also to the distributor.

For example, if the television program "Everyday Italian" is distributed to consumers by Comcast, corresponding second screen content can be automatically identified based on the topic of Italian cooking, and also based on the Comcast context. For example, the second screen presentation might include a recipe obtained from Comcast's Italian language channel RaiItalia. The recipe may be presented with a hotlink that—if touched by the user—provides information about this Italian language offering, and detailing discounted subscription terms. Alternatively or additionally, Comcast may have a partnership with Amazon, by which Italian recipes are presented in the second screen content for "Everyday Italian," and are linked to the cookbooks from which they originated, using the Amazon web site.

In contrast, if the same television program is distributed to consumers by Hulu, different second screen content can be identified. For example, recipes may again be presented—but this time linked to another Italian cooking program distributed by Hulu, "FoodMojo." Or Hulu may have a cookbook partnership with Barnes & Noble.

(These embodiments assume that the different distributors encode the television program with digital watermark data indicating the distribution source.)

A different method involves extracting fingerprint data from content and sending it off to a remote server. In addition to returning bibliographic information about the content (or alternatively to returning such information), the remote system replies with watermark data. This watermark data can correspond to the same content just-analyzed, or different content. For example, it may correspond to an excerpt of the content that has not yet been delivered to the consumer. Or the fingerprint data may be extracted from content of one type (e.g., audio), and the returned watermark data may correspond to content of a different type (e.g., video or imagery).

In a variant arrangement, the method extracts fingerprint data from one excerpt of content, and the remote system returns fingerprint data corresponding to a past or future excerpt of the same content.

Relatedly, a system may extract watermark data from content, and send it to a remote service. In reply, the remote service returns fingerprint data. Again, this fingerprint data may correspond to the same content from which the watermark was decoded, or different content. Again, it may correspond to an excerpt that will soon be delivered to the consumer (e.g., in less than 5 seconds, 20 seconds, a minute, 5 minutes, etc.). Or it may correspond to a different content type (e.g., decode watermark from audio, and receive fingerprint data for video or imagery).

Similarly, the method may decode watermark data from one excerpt of content, and the remote system may return watermark data corresponding to a past or future excerpt of the same content (e.g., with the intervals as stated in the previous paragraph).

(Fingerprint data can comprise salient point information, such as—for imagery—SURF features. Fingerprint and watermark data may each comprise intermediate data generated in the process of determining a fingerprint or a watermark, such as FFT coefficients.)

Social Network

Other aspects of the present technology involve social networks.

As is familiar to artisans, social networks—such as Facebook, MySpace, Google+, Twitter and LinkedIn—define linked networks of individuals and other entities. In network terminology, the individuals/entities commonly take the role of network "nodes," and the relationships between the individuals/entities (likes, friend, sister, employee, etc.) take the role of "ties" between the nodes. ("Nodes" are sometimes termed "objects," and "ties" are sometimes termed "links," "edges," "connections" or "actions.")

Data corresponding to the nodes and ties are stored in a data structure. The data structure may be distributed between several different disc drives (or other storage), at various different physical locations.

Facebook exposes the graph data defining its social network to software developers, and allows application programs ("apps") and web sites to serve as graph objects. Thus, the Facebook social graph enables a user to "like" a web site. The ties that can exist between nodes/objects have also been expanded to include various actions, e.g., to allow a user to "watch" Netflix, and "listen" to Spotify.

The graph protocol also lets developers define their own objects and actions. For example, a cooking app may define the action "cook," which can be applied to a cookie recipe. The app's user interface display can include a button that, when activated by the user, adds data to the Facebook graph indicating that the user cooked the cookie recipe. Likewise, Spotify can post nodes and ties to a user's social graph indicating songs the user listened to using the Spotify music streaming service.

Nodes and ties newly added to a user's social graph are used by Facebook to author updates that may be presented as news feed entries to the user's Facebook friends. Thus, Alice's friend Bob may find an entry in his news feed reporting that Alice listened to the Rush song "Finding My Way," using the Spotify service.

Figure 4:
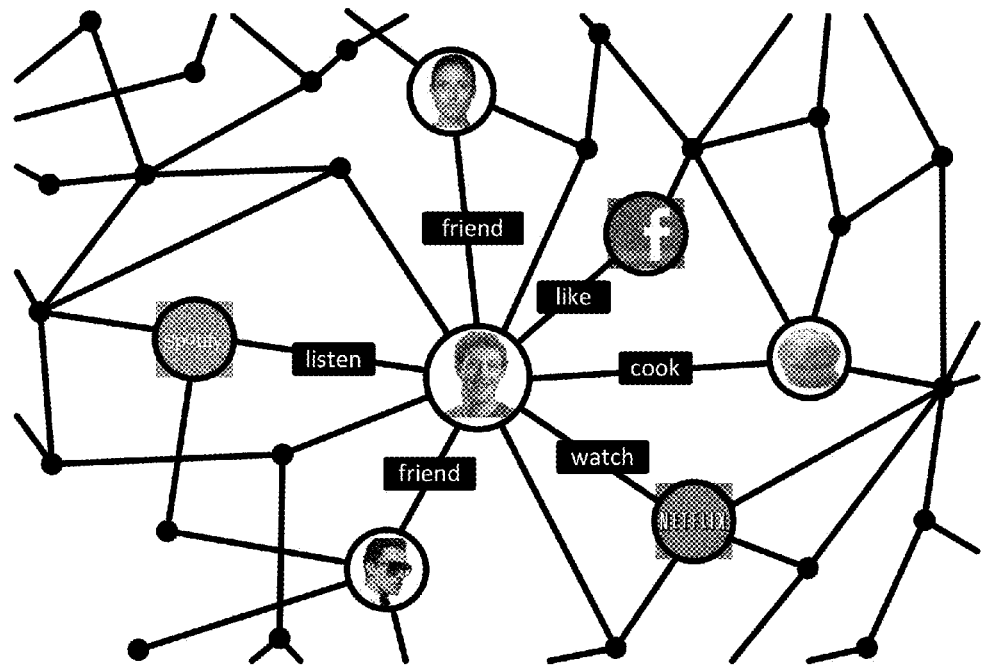
FIG. 4 is a view of the Facebook network graph.
Figure 5:
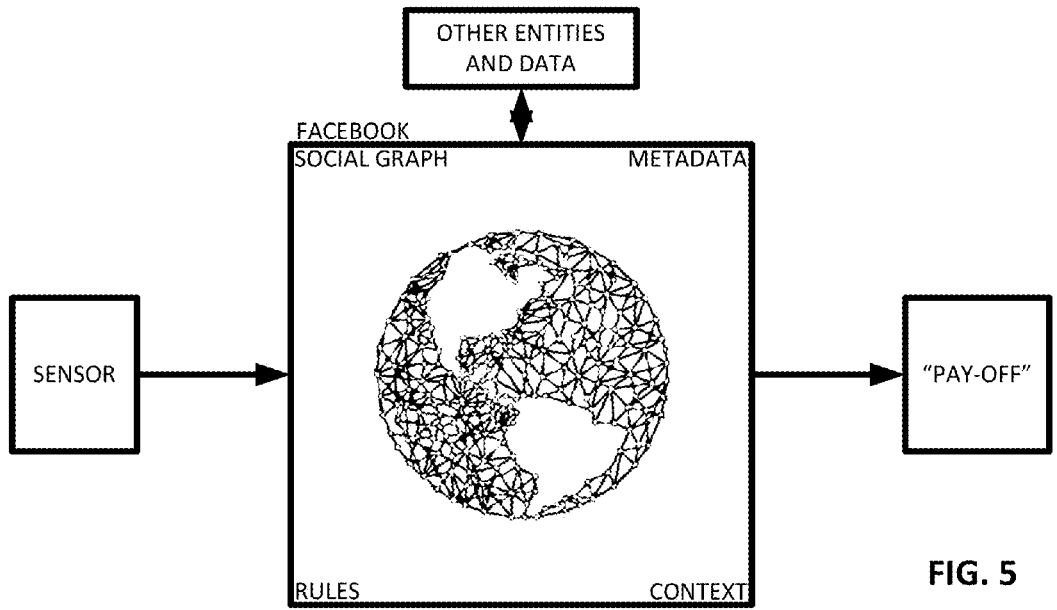
FIG. 5 is a conceptual view of a social network embodiment.

This prior art arrangement is shown, in part, in the Facebook diagram reproduced as FIG. 4. Additional details are provided in the Facebook developer's documentation, excerpts of which are attached as Appendices A-D (which is already familiar to artisans).

Each node in the Facebook graph is identified by a unique ID, and has various properties associated with it. For example, the official page for the Facebook Platform has ID 19292868552, and its properties can be viewed at the URL https://graph<dot>facebook<dot>com/19292868552, as follows:

```
{
  "name": "Facebook Platform",
  "type": "page",
  "website": "http://developers.facebook.com",
  "username": "platform",
  "founded": "May 2007",
  "company_overview": "Facebook Platform enables anyone to build...",
  "mission": "To make the web more open and social.",
  "products": "Facebook Application Programming Interface (API)...",
  "likes": 449921,
  "id": 19292868552,
  "category": "Technology"
}
```

Connections between Facebook nodes also are assigned unique IDs, and again have various associated properties, as more particularly detailed in the Facebook Graph API reference documentation (published on the web, e.g., at https://developers<dot>facebook<dot>com/docs/reference/api/).

In accordance with one aspect of the present technology, imagery is captured by a user's smartphone camera from a physical object, and is analyzed to obtain identification data identifying the object. (This analysis may be by digital watermark decoding, fingerprint-based object recognition, barcode reading, etc.)

Instructions are then issued to update the user's social graph to add node and tie elements. The node element corresponds to the identified object. The tie element indicates the user's interaction with this object.

In a particular example, the first physical object may be the Nov. 15, 2011, Oregonian newspaper, page 1. The user's interaction may be "viewed."

Having been added to the user's social graph, this information is published, e.g., by Facebook for viewing by one or more of the user's Facebook "friends" (such as in their news feeds). The solitary transaction of viewing a newspaper page is thus revealed in a social context.

By this arrangement, a physical object is identified by reference to captured imagery, and the user's interaction with the object is automatically publicized to the user's friends. The action of viewing the page has been turned into an observable event, brought into social view.

Facebook, or another service provider, can respond to the user's capture of imagery with a "pay-off," such as the provision of related information. This responsive information is based on the identified object, and can also be based on one or more other node/tie elements of a social graph data structure—either the user's, or the social graph of one or more other users (e.g., the user's friends).

For example, if Bob takes a picture of a new Prius automobile (the third generation, "XW30"), the Facebook system may return a response that includes information about new Prius inventories of local dealerships. The response may further include Prius photographs taken by Bob's friends. (The determination of such response information may be made by Facebook, or Facebook may simply serve as the communications conduit for response information determined by another entity.)

In some instances, if Bob captures an image of a Prius, the system may provide a response that is based, at least in part, on his friend Alice's interaction with a Nissan Leaf (e.g., sending Bob a picture of Alice with her new Leaf automobile).

Such capability is aided by semantic reasoning, which is facilitated by expressing information in the social graph (or linked to it) in the form of RDF triples, or other semantic web structure. By reference to public stores of such linked data (e.g., DBpedia—which presents structured knowledge from Wikipedia using semantic web expressions), the system can discover that the Prius is a Partial Zero Emission Vehicle (PZEV, per the California EPA/Air Resources Board). Searching other social graph and DBpedia data, the system can discover that the Nissan Leaf captured in Alice's imagery is a Zero Emission Vehicle (ZEV). The system may reason that if Bob is interested in a PZEV vehicle, he may also be interested in a ZEV vehicle, and thus provide information about Alice's Leaf automobile to Bob.

(The DBpedia entry about Partial Zero Emission Vehicles is attached as Appendix E—illustrating the variety of information linked to this term. The system refers to this information to discover related linked data, which is then used in fashioning semantically-relevant pay-offs to the user. Such semantic knowledge can also be applied by the system in selecting advertising to be presented to the user, and in reporting demographic information back to advertisers.)

Desirably, the nodes and/or ties added to the user's social graph are expressed using RDF or other semantic expressions, so that the information expressed by these graph elements can inform later system reasoning.

When a user captures imagery of an object, descriptive metadata may also be available—either provided from the user, or otherwise. (Arrangements for automatically generating image metadata are known; see, e.g., patent publication 20100046842.) This information can be added to the data store (e.g., as part of the social graph, or linked to it), and can enable different functionality. (Again, RDF expressions or the like are desirably used.)

For example, Bob's picture of the Prius automobile may be OCR-processed—by Bob's smartphone or by another processor—to extract text depicted in the image (e.g., the license plate numbers). This text can be passed to Facebook for storage with the node data associated with the depicted Prius. This text can later be used to identify the same car in other pictures—allowing refinement of subsequent responses, either to Bob or others.

The captured imagery itself, or a version thereof (e.g., compressed) may be stored in, or linked to, the social graph (again, preferably in linked data form). In some embodiments, it is a Facebook server—rather than the user's smartphone—that analyzes the captured imagery to obtain corresponding identification data. In such embodiment, image data is provided to the social network service, and it attends to producing identification data, metadata, and instantiating an appropriate node/tie in the user's social graph.

In accordance with another aspect of the technology, different rules may be applied to information about physical objects encountered by the user and depicted in captured imagery. For example, when Bob captures an image of a Prius, this information may be posted to his social graph, and associated privacy rule data may permit his Facebook friends to see related information. However, when Bob captures an image of his daughter Caroline, associated privacy rule data may prohibit his Facebook friends from seeing related information. Thus, if the image analysis has one outcome, one set of rules is applied to resultant information, and if the image analysis has a second outcome, a different set of rules is applied to the resultant information. Authoring tools can enable the user to readily apply different rules to different classes of objects. The rule data can be stored in the user's smartphone, but more typically is stored in a remote (e.g., "cloud") repository, such as in Facebook's servers.

In accordance with yet another aspect of the technology, different software can perform different operations on user-captured imagery. For example, if Bob captures an image of an advertisement in a magazine, image fingerprint software may identify it as an advertisement by Home Depot, promoting its $999 cedar deck kit special. A node can be added to Bob's graph corresponding to the $999 Home Depot home cedar deck kit ad, and a tie can be added expressing that Bob viewed this ad.

The imagery captured by Bob may be archived by Facebook, where another app may later analyze it (e.g., by digital watermark decoding) and make a second, different identification, involving the distribution channel for the ad, e.g., that it is the Home Depot advertisement that ran in the Apr. 25, 2011, California edition of Better Homes and Gardens, on page 45. As different information is discerned from the imagery, such additional information can be added to the data store.

This new information can be added to the data store in various ways. For example, the existing social graph can be refined, such as by augmenting the earlier-created node that corresponds to the $999 Home Depot cedar deck kit ad with metadata reflecting the distribution channel information (i.e., the Apr. 25, 2011 California edition of Better Homes and Gardens, page 45). This metadata can be literally stored with the node data, or linked to it. Alternatively, this further information can serve as the basis for a new node in Bob's social graph, e.g., for page 45 of the Apr. 25, 2011, California edition of Better Homes and Gardens, including an ad for Home Depot. A variety of other data storage arrangements can also be used (again, preferably in a semantically-accessible form).

As further software operates on the archived sensor data, different or additional actions can thereby be taken. For example, in response to the first, image fingerprint-based object identification, Facebook may notify Home Depot that a user in the Los Angeles area captured imagery of its $999 cedar deck kit advertisement. In response to the second, digital watermark-based identification, Facebook may notify the publisher of Better Homes and Gardens that a user in the Los Angeles area captured imagery of the cedar deck kit advertisement that ran on page 45 of the Apr. 25, 2011, California edition.

In like fashion, if Bob is listening to the song "Finding My Way," by the band Rush, the song can be recognized, e.g., by the Gracenote MusicID service, and this event can be added to Bob's social graph. If this captured audio is archived and later analyzed to discern encoded digital watermark data, the graph may be revised to reflect that Bob was listening to Rush on the Sirius satellite music service.

As the system accumulates semantically-accessible information about the user's interactions with physical and media objects, it generates a rich collection of reference data that can inform the system's (and the smartphone's) reaction to future stimuli. For example, the system can determine not simply what object is pictured, but it can also begin to discern why the user may be interested in that object. For example, if Alice captures imagery of a pair of Jimmy Choo motorcycle boots at Nordstrom, is her interest more likely based on being a Jimmy Choo admirer, or a motorcycle enthusiast? Her history of previous image captures can resolve this ambiguity, and such knowledge can then be used in determining appropriate system responses.

(While present usage models require a user to point a handheld smartphone camera at objects to capture imagery, it is expected that image capture will become more ubiquitous—and less user-involved—in the future. Cameras integrated in eyewear are one foreseeable technology. In such case, user interest in an object will be inferred from viewing time, and head and/or hand movements that a user may sometimes employ when visually pondering an object.)

The rich collection of structured information that the present technology provides also serves as a resource to which commercial entities can apply business rules, to pick users for targeted advertising, at contextually-appropriate marketing moments. For example, if Bob is viewing the Home Depot advertisement for a cedar deck special, the competing home improvement chain Lowe's may be willing to pay Facebook $5 or $10 to present a competing decking offer to Bob at that moment. (Such opportunities can be offered via automated auctions to prospective advertisers, in a manner akin to Google's AdWords auctions. See, in this regard, Jansen et al, Sponsored Search: an Overview of the Concept, History and Technology, Int. J. Electronic Business, Vol. 6, No. 2, pp. 114-131, 2008; and Levy, Secret of Googlenomics—Data-Fueled Recipe Brews Profitability, Wired Magazine, May 22, 2009; attached as Appendices F and G.) Such business rules, in conjunction with the structured social network data, allow Facebook and others to monetize user-object interactions.

Further, marketing opportunities are not assessed exclusively on Bob's present activities, but also his historical activities, his friends, and other aspects of his context. And they extend beyond Bob to his friends, and may involve other nodes in his social graph.

For example, Lowes may pay $5 to present a competing decking advertisement to Bob while he is considering the Home Depot print advertisement. Lowes may pay still more if Bob is an influencer in his social network—with a demonstrated history of leading his social network friends in product decisions. With such a history, Home Depot may pay a first sum to have Bob's apparent consideration of the Home Depot cedar deck ad posted to Bob's friends in their news feeds, e.g., "Bob is considering decking from Home Depot." This sum can depend on the number of Bob's friends, and their respective demographics and social network influence. If most of Bob's friends are men 25-45 years old, Home Depot will likely pay more than if half of Bob's friends are women 18-25 years old. Similarly, if most of Bob's friends are in rural North Dakota, where Home Depot has no store, it will likely pay less.

Home Depot and/or Lowes may also pay Facebook to present ads or newsfeed updates to a demographically-selected subset of Bob's friends. For example, if Bob and his friend Charlie are friends with a strong link strength (e.g., each regularly reviews news feed items relating to the other; they have many mutual friends; they have exchanged messages back and forth, etc.), and Charlie's social graph indicates he is active in various home improvements (e.g., by reference to magazines he reads, and product barcodes he scans, and a geolocation history that often includes visits to hardware stores on weekends), then Home Depot might pay Facebook another $5 to present an electronic counterpart to the decking ad to Charlie, alerting Charlie to the fact that Bob recently studied this ad.

The social network service from which the relevant data is mined needn't be the conduit for delivery of content/advertising. Google, Bing, and others can cooperate with Facebook, so that the information in Facebook's data stores can inform decisions made by Google and Bing in their respective actions. That is, a Bing pay-off can be determined, in part, using Facebook information, which allows Bing to tailor the response based on user-specific social context.

For example, assume Bob's friend Charlie "likes" the fan page for the band Rush, and listens to Rush tracks frequently on Spotify, and routinely views Rush music videos soon after their release, and that all this information is reflected in Charlie's social graph. When Bob then uses Bing to make a search for "progressive rock music," Bing consults Facebook for Bob's social context and finds a "Rush" flavor through his strong link to Charlie, so Bing elevates Rush-related links in the search results presented to Bob.

It will thus be recognized that features of the arrangements just-detailed in this "Social Network" section can be combined with the OS-integrated search arrangements earlier detailed (and vice versa).

Still further, applicant intends that all of the technologies disclosed herein be used in conjunction with those detailed in published applications 20110212717, 20110161076 and in pending application Ser. No. 13/287,853, filed Nov. 2, 2011. For example, application 20110212717 details a variety of intuitive computing methods by which smartphone-captured imagery and audio is processed to fulfill the user's anticipated desires, as informed by context. Elements and teachings concerning the integrated search functionality (e.g., Bing) and the social network integration that are both detailed above are well suited for incorporation into implementations of the 20110212717 technology. (Likewise, applicant intends that elements and teachings of the 20110212717 disclosure be included in embodiments of the presently-detailed technology.) Similarly for the other cited references.

From the foregoing, it will be recognized that certain embodiments of this technology leverage social networking constructs to engage and expose the physical world as experienced by smartphone sensors, using syntax that other entities can parse and mine in applying rule-based processes.

Further Details

An exemplary embodiment involves the Digimarc Discover software app, e.g., as detailed in application Ser. No. 13/287,853. When a user (Bob) employs a smartphone camera to capture imagery from a picture (e.g., of a September 29 soccer game between the Timbers and the Galaxy) published in a newspaper (e.g., page D1 of the Sep. 30, 2011, issue of The Oregonian), the app generates identification data from the captured imagery, and then uses this identification data to determine a pay-off that is provided back to the user (e.g., a highlights video from the Timbers/Galaxy soccer game), via an HTML5 template.

In accordance with this aspect of the present technology, such software app posts a node and a tie to Bob's social graph. (This may be done via intermediary software on a Facebook server.) These additions to the social graph indicate that Bob viewed the picture of the September 29 soccer game between the Timbers and the Galaxy, as published on page D1 of the Sep. 30, 2011, issue of The Oregonian, using the Digimarc Discover app. These data elements may be time-stamped, indicating the time they were received (e.g., at the Facebook server).

Other software runs on the Facebook server(s) and identifies marketing moments for advertisers. More particularly, this software examines new nodes/ties posted to users' social graphs, and makes available certain related information to advertisers and other third parties. This related information can be a version of the information in the new nodes/ties, with personally-identifying information removed.

When a third party is alerted of the new elements posted to a user's social graph, it may have an interval of time (e.g., extending to a point 200 ms or 500 ms from the timestamp in the data elements) within which to indicate to Facebook the third party's desire to take an action (e.g., present a marketing message) with respect to such user (Bob).

Third parties may rely on stored rule data to automatically express their interest to such marketing moments. One such third party may be the Major League Soccer league (MLS). Its stored rule data (e.g., resident on a disk or memory in a Facebook server) may specify an interest in possibly presenting a promotional message whenever any new node or tie element is added to a Facebook social graph mentioning specified keywords relating to soccer (e.g., "soccer," "penalty kick," etc.) or any of the league's trademarks ("Timbers," "Galaxy," etc.), or any of the leagues players names ("Darlington Nagbe,", etc.), etc.

If any such keyword is encountered, the stored rule data may apply one or more other rules, to decide whether to request presentation of advertisement, and—if so—the parameters of the ad (e.g., its content, its placement, its cost, etc.).

These other rules depend on other (anonymized) elements in the user's social graph. Information about these other elements can be provided by Facebook at the time information about the new addition to the social graph is first made available, or later—e.g., in response to a query from a potentially-interested third party.

For example, if the user has previously "Liked" the Portland Timbers web site, this will increase the likelihood that MLS will want to present information to the user. It may also increase the price that MLS is willing to pay for a marketing moment. (If the user has "Liked" several soccer-related websites, this will increase such factor. For example, this factor may be a numeric count of the number of soccer-related websites the user has "Liked.") Similarly, if the user has an ESPN app on the user's Facebook page, and the ESPN app is configured to report scores of one or more MLS teams, this will also be important. (If the ESPN app is configured to report only soccer scores—no basketball or baseball scores, etc.—this factor becomes even more important.)

If the user's social graph reveals he occasionally visits the Facebook page for Nike Soccer, this is another factor that may interest MLS. Similarly, if the user's photo collection includes photos with soccer related captions or annotations (e.g., "My new Nike CR7 Mercurial Superfly shoes," or "Goal!!!").

Other demographic information about the user stored by Facebook can also be utilized by the stored rules, e.g., age, hometown, interests, etc. This information may be stored separately from the social graph data. It may also form part of the social graph data—either expressly, or by inference. (E.g., if most of the people to whom Bob has friend ties in his social graph list their hometowns as Seattle, this is evidence that Bob's hometown is Seattle.)

Other factors can include the degree to which the user's friends have apparent interest in soccer, e.g., as indicated by the foregoing metrics as applied to them. Those friends with which the user has greater numbers of social graph ties (e.g., due to exchanging messages, reading news about the friend, etc.) are scored more highly in such analysis than friends with which the user has lesser numbers of social graph ties.

In a particular embodiment, the stored rules consider many such factors, and compute a net score indicating the MLS' interest in presenting a marketing message to the user whose social graph was updated a few milliseconds ago. Such factors can be weighted to different degrees in accordance with their importance, and combined, e.g., with a polynomial equation.

The following exemplary scoring equation uses input factors M1, M2, M2 and M4 to yield a score S for the user. Factors A, B, C, D and exponents W, X, Y and Z can be determined experimentally, or by Bayesian techniques:

$$S=(A*M1)^W+(B*M2)^X+(C*M3)^Y+(D*M4)^Z$$

Several such scores may be computed by, or on behalf of, the third party—tuned to different marketing messages. For a marketing message that promotes ticket sales to an upcoming game, the relevant factors may relate to calendar data for the user (which may be obtained from a Facebook calendar app, or elsewhere), the user's apparent interest in one or more of the teams competing in the game (per social graph elements), and the user's physical proximity to the game location (e.g., as indicated by the user's hometown, or the user's current location—as indicated by GPS or other location sensing technology). For a marketing message that invites the user to subscribe to the MLS blog, factors tending to show that the user likes reading soccer-related news may be weighted most heavily.

Returning to the Digimarc Discover app on the smartphone, it employs an HTML5 template is dynamically configured to overlay up to five user interface (UI) buttons on the screen of Bob's smartphone. These buttons are rendered (or not) based on response data received from software (e.g., Digimarc software) running on a Facebook server (e.g., in association with the user's Facebook page).

After the allotted response interval for third parties has elapsed (e.g., 200 or 500 milliseconds), the Facebook server sends a response back to the Digimarc Discover app on Bob's smartphone. The response data includes instructions that customize the HTML5 template in accordance with the newspaper picture, as well as in accordance with information gleaned from Bob's social graph. (The customized template can be sent from the Facebook server, or just the customization instructions can be sent and applied to a template stored on the smartphone.)

For example, the response data can include an HTML link to a video that shows highlights of the September 29 Timbers v. Galaxy game (corresponding to the picture in The Oregonian). This link can be associated with the first button in the template, and may be labeled "Game Highlights Video."

The response data can also include an HTML link to an MLS website to buy tickets for upcoming Timbers soccer games. This link may be associated with the second button in the template, and may be labeled "Game Tickets."

The response data can further include a link to an MLS website that posts the schedule for the remainder of the Timbers season. This link may be associated with the third button in the template, and may be labeled "Timbers Schedule."

The response data can also include a link to a Portland Timbers blog, where players offer comments about recent games (e.g., by the fourth button, labeled "Player Comments").

The response data can also include a link to a Pepsi website, where the user can see a video of season highlights by a Timbers player (e.g., Darlington Nagbe), whose name is found in the user's social graph. The video may start with a promotional message, noting that Pepsi is a corporate sponsor of the Portland Timbers. This link may be associated with the fifth button in the template, and may be labeled "Nagbe Highlights Reel."

The game highlights video data associated with the first button was determined by The Oregonian, based on the newspaper picture that Bob imaged using his smartphone.

The data associated with the second through fifth buttons was determined based on information in Bob's social graph, as processed by rules defined by different third parties.

In one particular embodiment, Facebook or Digimarc is responsible for pricing the different button placements. A fixed price may be set, such as $1/10^{th}$ of a cent for the second button, $1/20^{th}$ of a cent for the third button, $1/25^{th}$ of a cent for the fourth button, and $1/30^{th}$ of a cent for the fifth button. (Pricing may be a function of the likely order in which the user will read the buttons, and/or the ease with which the user can tap the button on the smartphone screen using the user's thumb—again placement-dependent.) If multiple parties want to present their marketing message via the second button, algorithms can be used to arbitrate the conflict (e.g., awarding the button to the party that spent the most on such advertising in the past day or week, or to the party who most recently started advertising in such fashion, or the party that has lost the most such arbitrations in the past day or week, etc.).

In another arrangement, pricing is set by automated auction. Each party that is interested in a button indicates a price it is willing to pay. The button is "sold" to the highest bidder, e.g., for a price below the highest bid, and above the second-highest bid. (This is a variant of the Google AdWords auction.) A variety of other auction techniques can naturally be used.

If one or more of the second through fifth buttons is not "sold," it can be used for other purposes. For example, the media publisher (e.g., The Oregonian) may be granted the space, where it may present a link, e.g., to the most recent writing by its sportswriter who covers soccer. Or it may offer a discounted newspaper subscription, etc.

Alternatively, unsold button(s) can be used by Facebook, e.g., inviting the user to engage in an activity on Facebook based on the user's social graph, including the recent interest in the Timbers v. Galaxy game (e.g. "Visit the Timbers' Facebook Page").

By such arrangement, the system responds to visual content—seen by the camera of a user's smartphone—with a response that is contextually-tailored by the user's social graph. In the described implementation, Facebook serves as a virtual visual cortex through which input imagery is processed in determining how it should be perceived by the user's smartphone.

Other Comments

Having described and illustrated the principles of this inventive work with reference to a few examples, it should be recognized that the technology is not so limited.

For example, while certain embodiments were detailed in the context of the Bing search service, it will be recognized that the Bing service is not required. Nor, in the social network embodiments, is Facebook required.

While certain described arrangements may require the user to activate certain content identification functionality, in other embodiments this functionality may always be active, or may automatically be activated based on user context.

Likewise, while some of the above discussion described certain functionality as being provided by the operating system, in other embodiments such functionality can be provided by modules distinct from the operating system.

In embodiments that capture imagery from physical objects, it will be recognized that the physical objects can comprise anything. Examples include printed media (e.g., books, newspapers, posters, magazines), people, electronic displays, etc.

Moreover, while some detailed embodiments focused on captured imagery, it will be understood that such technology is likewise applicable to captured audio (and vice versa). Likewise, identification data sensed from passive NFC/RFID chips on objects, can be treated like object identification information derived from imagery and audio.

The response to captured content needn't be directed (or directed exclusively) to the user. For example, if Bob takes a picture of a Prius automobile, Facebook may respond by sending a notification to Toyota. And the response provided to Bob needn't be provided to his smartphone. For example, one response may be to provide viewing credits for a video-on-demand movie that is sponsored by Toyota (e.g., a movie in which Toyota low emission vehicles play a prominent part).

All embodiments involving third party interaction with user data (e.g., targeted advertising) should only be implemented with appropriate user consent and privacy safeguards.

While the foregoing disclosure focused on smartphone-based embodiments, it will be recognized that this technology finds utility with all manner of devices—usually portable, but also fixed. Portable music players, desktop computers, laptop computers, tablet computers, set-top boxes, televisions, netbooks, wearable computers, servers, etc., can all make use of the principles detailed herein.

Particularly contemplated smartphones include the Apple iPhone 4s, and smartphones following Google's Android specification (e.g., the Verizon Droid Eris phone, manufactured by HTC Corp., and the Motorola Droid 3 phone).

The term "smartphone" (or "cell phone") should be construed to encompass all such devices, even those that are not strictly-speaking cellular, nor telephones.

(Details of the iPhone, including its touch interface, are provided in Apple's published patent application 20080174570.)

The design of smartphones and other computers referenced in this disclosure is familiar to the artisan. Each typically includes one or more processors, one or more memories (e.g. RAM), storage (e.g., disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.).

The processes and arrangements detailed in this specification may be implemented as instructions for computing devices, including general purpose processor instructions for a variety of programmable processors, including microprocessors (e.g., the Atom and A5), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays, field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Phones and other devices according to certain implementations of the present technology can include software modules for performing the different functions and acts.

Known browser software, communications software, and media processing software can be adapted for many of the uses detailed herein.

Although features and arrangements are described, in some cases, individually, applicant intends that they also be used together. Conversely, while certain systems are detailed as including multiple features, applicant conceives that—in other embodiments—the individual features thereof are usable independently.

Similarly, while this disclosure has detailed particular ordering of acts and particular combinations of elements, it will be recognized that other contemplated methods may re-order acts (possibly omitting some and adding others), and other contemplated combinations may omit some elements and add others, etc.

Likewise, aspects of the different embodiments can readily be changed and substituted.

Although disclosed as complete methods, sub-combinations of the detailed arrangements are also separately contemplated.

Similarly, while detailed as methods, it will be recognized that the present technology also includes systems for performing the steps of the methods, and computer-readable media containing software instructions to configure hardware to perform the methods.

Some of the present assignee's work concerning "second screen" technology is detailed, e.g., in published patent applications 20100119208, 20100222102, and 20100205628, and in pending application Ser. No. 13/207,841, filed Aug. 11, 2011.

Technology for encoding/decoding watermarks is detailed, e.g., in Digimarc's patent documents U.S. Pat. Nos. 6,614,914, 6,590,996, 6,122,403, 20100150434 and 20110274310; and in Nielsen's U.S. Pat. Nos. 6,968,564 and 7,006,555.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. No. 6,990,453 and U.S. Pat. No. 7,359,889 (Shazam).

Some of the assignee's previous work relating to context-responsive systems is detailed in published patent applications 20110161076 and 20110212717, and in pending application Ser. No. 13/207,860, filed Aug. 11, 2011, and 61/542,737, filed Oct. 3, 2011. (This latter application is attached as Appendix A to application 61/547,514.)

The term "social network" (and its variants) is used in this disclosure with its ordinary meaning. As is familiar, a social network service refers to an online service, platform, or site that focuses on building and reflecting social networks or social relations among people, who share, for example, interests, activities or other affiliation. A social network service typically includes a representation of each user (often a profile), his/her social links, and a variety of additional services. Most contemporary social network services are web-based and provide means for users to interact over the Internet, such as by public and/or private messaging, and by sharing photos.

Examples of popular social network services include Facebook, Pinterest, Flickr, Google+ and LinkedIn, although different services will doubtless become popular in the future.

To provide a comprehensive disclosure, while complying with the 35 USC Section 112 mandate of conciseness, applicant incorporates-by-reference the patent and other documents referenced herein (including the documents referenced in the appendices). Such materials are incorporated in their entireties, even if cited above in connection with specific of their teachings. These references disclose technologies and teachings that applicant intends be incorporated into the arrangements detailed herein, and into which the technologies and teachings detailed herein be incorporated.

In view of the wide variety of embodiments to which the principles and features discussed above can be applied, it should be apparent that the detailed embodiments are illustrative only, and should not be taken as limiting the scope of the invention. Rather, I claim as my invention all such modifications as may come within the scope and spirit of the following claims and equivalents thereof.

I claim:

1. A method comprising the acts:

capturing ambient audio from a user's environment using a smartphone, and producing samples of audio data therefrom;

generating fingerprint data from the audio data, using a processor of the smartphone, and providing the fingerprint data to a system, said generating including performing a series of Fast Fourier Transforms on overlapping windowed excerpts of the audio samples, each windowed excerpt comprising 1024 samples;

receiving, in response to said providing of the fingerprint data, fingerprint-based audio information identifying the captured audio;

also generating watermark-based distributor information by performing a digital watermark decoding operation on the audio data, using said processor, to extract digital watermark payload data previously steganographically encoded therein, said watermark payload data indicating a distributor that participated in delivering the audio to the user's environment; and selecting software for execution on the smartphone, from among plural alternatives, based on both the fingerprint-based audio information and the watermark-based distributor information, and executing said selected software;

wherein: first software is selected for execution when first audio content is delivered with participation of a first distributor, and second, different, software is selected for execution when said first audio content is delivered with participation of a second distributor different than the first distributor.

2. The method of claim 1 in which the ambient audio was earlier digitally watermarked by, or at the direction of, said distributor.

3. A portable user device including a microphone, a display, a wireless interface, a processor, and a memory, the memory containing software instructions configuring the device to perform acts including:

capturing ambient audio from a user's environment using the microphone, and producing samples of audio data therefrom;

generating fingerprint data from the audio data, using said processor, and sending the fingerprint data to a remote system using said wireless interface, said generating including performing a series of Fast Fourier Transforms on overlapping windowed excerpts of the audio samples, each windowed excerpt comprising 1024 samples;

receiving, in response to said sending of the fingerprint data, fingerprint-based audio information identifying the captured audio;

also generating watermark-based distributor information by performing a digital watermark decoding operation on the audio data, using said processor, to extract digital watermark payload data previously steganographically encoded therein, said watermark payload data indicating a distributor that participated in delivering the audio to the user's environment; and selecting software for execution on the portable device, from among plural alternatives, based on both the fingerprint-based audio information and the watermark-based distributor information, and executing said selected software;

wherein first software is selected for execution when first audio content is delivered with participation of a first distributor, and wherein second, different, software is selected for execution when said first audio content is delivered with participation of a second distributor different than the first distributor.

4. A non-transitory computer-readable medium containing software instructions for configuring a portable user device to perform actions including:

capturing ambient audio from a user's environment using a microphone, and producing samples of audio data therefrom;

generating fingerprint data from the audio data and sending the fingerprint data to a remote system, said generating including performing a series of Fast Fourier Transforms on overlapping windowed excerpts of the audio samples, each windowed excerpt comprising 1024 samples;

receiving, in response to said sending of the fingerprint data, fingerprint-based audio information identifying the captured audio;

also generating watermark-based distributor information by performing a digital watermark decoding operation on the audio data to extract digital watermark payload data previously steganographically encoded therein, said watermark payload data indicating a distributor that participated in delivering the audio to the user's environment; and selecting software for execution on the smartphone, from among plural alternatives, based on both the fingerprint-based audio information and the watermark-based distributor information, and executing said selected software;

wherein first software is selected for execution when first audio content is delivered with participation of a first distributor, and wherein second, different, software is selected for execution when said first audio content is delivered with participation of a second distributor different than the first distributor.

5. The method of claim 1 wherein said act of producing samples comprises producing samples at a rate of 8000 per second.

6. The method of claim 1 wherein said overlapping windowed excerpts overlap by 64 samples.

7. The method of claim 1 in which the selected software comprises software provided by said distributor.

8. The method of claim 1 in which the selected software comprises software provided by a competitor of said distributor.

9. A portable user device including a microphone, a display, a wireless interface, a processor, and a memory, the device including:

first means for generating audio information identifying audio captured by the microphone;

second means for generating distributor information indicating a distributor that participated in delivering the audio to an environment of the user; and instructions in the memory that configure the device to select software for execution on the portable device, from among plural alternatives, based on both said audio information and said distributor information, and executing said selected software;

wherein the device is configured to: select first software for execution when first audio content is delivered with participation of a first distributor, and select second, different, software for execution when said first audio content is delivered with participation of a second distributor different than the first distributor.

* * * * *